United States Patent [19]

van Iperen

[11] Patent Number: 4,665,834
[45] Date of Patent: May 19, 1987

[54] APPARATUS FOR INTERMODAL TRANSPORT OF HIGHWAY CONTAINERS

[75] Inventor: Willem H. P. van Iperen, Westfield, N.J.

[73] Assignee: Sea-Land Service Inc., Elizabeth, N.J.

[21] Appl. No.: 766,826

[22] Filed: Aug. 16, 1985

[51] Int. Cl.⁴ .......................... B61D 3/12; B61D 3/20
[52] U.S. Cl. ..................................... 105/4.1; 105/418; 280/80 B; 280/404; 410/53
[58] Field of Search .................. 105/4 R, 159, 215 C, 105/176, 363, 393, 418, 4.1; 410/44, 45, 53, 54, 56, 57; 280/80 B, 404; 213/182

[56] References Cited

U.S. PATENT DOCUMENTS

| | | | |
|---|---|---|---|
| 2,036,535 | 4/1936 | Nelson | 105/159 |
| 2,058,955 | 10/1936 | Culemeyer | 280/404 X |
| 2,138,043 | 11/1938 | Ronk | 105/215 C |
| 2,204,667 | 6/1940 | Dooley et al. | 105/159 |
| 2,841,094 | 7/1958 | Schumacher | 410/53 |
| 2,844,108 | 7/1958 | Madden | 410/53 |
| 2,920,580 | 1/1960 | Williams | 105/4 R X |
| 2,992,621 | 7/1961 | Schoen | 410/53 X |
| 3,812,791 | 5/1974 | Barnard | 105/393 |
| 4,179,997 | 12/1979 | Kirwan | 410/53 |
| 4,355,584 | 10/1982 | White, Jr. | 105/215 C |
| 4,385,857 | 5/1983 | Willetts | 410/53 |
| 4,386,880 | 6/1983 | Schimmeyer | 410/56 |
| 4,397,243 | 8/1983 | Hickman | 105/159 |
| 4,416,571 | 11/1983 | Krause | 410/53 |
| 4,566,714 | 1/1986 | DeWitt et al. | 280/404 |
| 4,597,337 | 7/1986 | Willetts | 105/4 R |

OTHER PUBLICATIONS

Watson, J. Commerce, Dec. 1983.
Railmaster System, Inc., brochure.

Primary Examiner—Randolph A. Reese
Attorney, Agent, or Firm—Scully, Scott, Murphy & Presser

[57] ABSTRACT

An intermodal apparatus for the rail transportation of containers with or without a highway chassis includes double axle rail bogies having a lower bogie frame and an upper platform section. The upper platform section includes a pair of connecting plates each having locking clamps for clamping to openings in the bottom corner castings on the front and rear ends of the container. A pair of spaced elongated push pull bars extend between two rail bogies adjacent the longitudinal sides of the container. The bars absorb the longitudinal forces exerted on the bogies as the trailers are transported along the rails to prevent the forces from being exerted on the trailers. The upper platform section includes a lifting mechanism for raising and lowering a container chassis combination.

28 Claims, 4 Drawing Figures

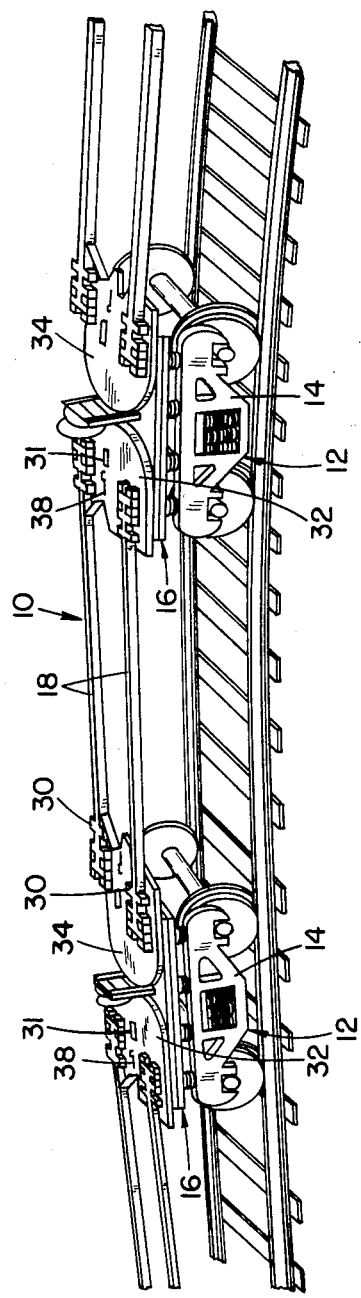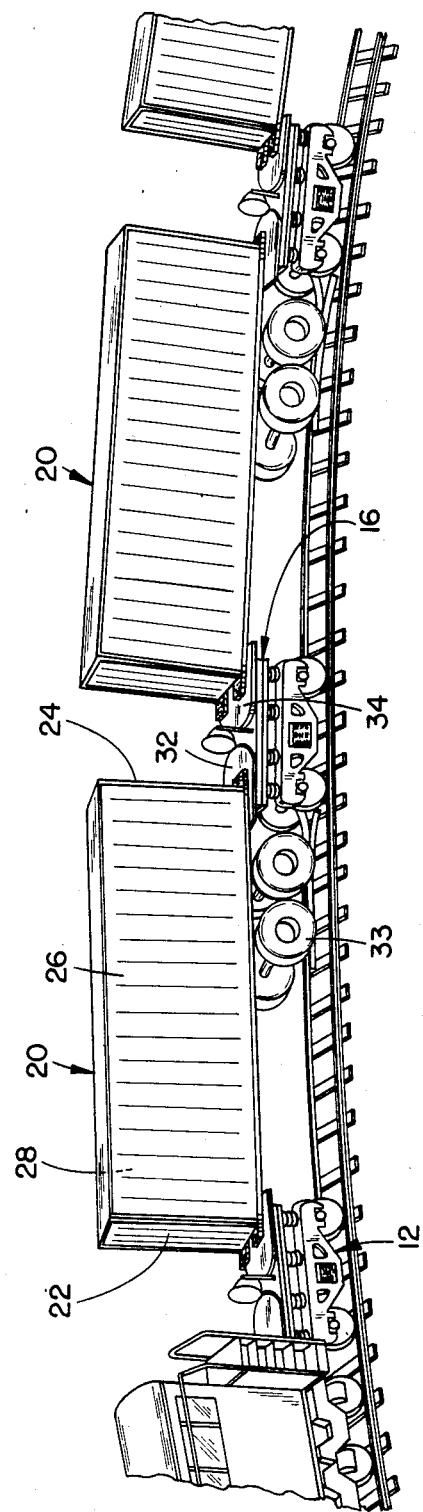

APPARATUS FOR INTERMODAL TRANSPORT OF HIGHWAY CONTAINERS

BACKGROUND OF THE INVENTION

1. Field of the Invention

This invention relates to an intermodal system for the transport of highway containers by rail.

2. Description of the Prior Art

The efficient transport of highway containers by rail has been a goal of the transportation industry for many years. In one intermodal system, containers and trailers are placed on steel rail flatcars for rail transportation. Generally, two containers or trailers are attached piggyback on the flatcars. One of the principal deficiencies of the piggyback flatcar system is the added equipment needed to load and unload the containers. In addition, the extreme weight of the flatcars greatly increases fuel costs of the system. In a desire to reduce the overall weight for fuel savings, intermodal systems that eliminate the flatcar were developed.

One such prior art system utilizes a rail bogie to support the highway container on each end. In U.S. Pat. No. 2,841,094 issued to Schumacker, the fifth wheel of the highway trailer is attached to a female coupling on the bogie. The trailer bodies are specially constructed with an inner truss to permit the rear sections of two trailers to be attached back to back between the bogies. The amount of space between the highway wheels of the trailer and the railroad tracks is limited by the height of the fifth wheel coupling mechanism attached to the bogies. The truss structure increases the tare weight of the trailer, which reduces the net cargo weight, thereby reducing revenue.

In U.S. Pat. No. 2,844,108 issued to Madden, a rail bogie includes bracket arms for gripping the axle of the highway trailer and a hydraulic jack for lifting the axle and the highway wheels off the ground. Modifications must be made to the trailer body including an additional fifth wheel, a center sill and a sub-frame to connect the bogies to the trailer. The modifications also add weight to the trailers that translates into a revenue and fuel loss.

In U.S. Pat. No. 4,416,571 issued to Krause, the trailer is modified to permit removal of the axle carrying the highway wheels before the containers are placed on the railroad bogies. A crane is needed to lower the trailers onto the railroad bogies.

Thus, there is a need for simple lightweight, cost efficient system for the transport of highway containers by rail.

SUMMARY OF THE INVENTION

It is an object of the present invention to provide an intermodal apparatus for the rail transportation of highway trailers that is lightweight and fuel efficient.

It is a further object of the present invention to provide an intermodal apparatus that utilizes standard containers without modification.

It is another object of the present invention to provide a means for absorbing the dynamic push-pull forces normally exerted on a railcar during rail transportation to prevent these forces from causing damage to the containers.

The present invention provides an apparatus for transporting a container, with or without a highway chassis, by rail including two double axle rail bogies releasably attached under each end of the container. The bogies may include a lifting means for raising and lowering a highway trailer off the ground. A pair of spaced elongated bars are releasably attached to the rail bogies and extend between the bogies adjacent the longitudinal sides of the container. The bars are force and stress relieving bars that absorb the horizontal push-pull forces exerted on the bogies during the transport of the container by rail thereby preventing the forces from being exerted on the container.

The containers adapted for intermodal use are standard containers having a rigid reinforced frame including corner castings to facilitate double stacking and piggyback connections. The containers are transported by rail either with or without a highway chassis. A container with a highway chassis is a trailer and includes a double wheel axle frame on the rear end and a fifth wheel in the front end to transport the trailer over the road with a tractor. The containers are made in three basic sizes: 35, 40 and 45 ft. long. The maritime containers of only 20 feet long may be transported by using a twin 20 foot chassis to support two 20 foot containers back to back.

The bogie includes an upper platform section axle rail bogie frame. The upper mounted onto a lower double platform section includes a pair of upper connecting plates each having means for clamping to either end of the container body which lock into the front and rear bottom corner castings of either a container only or a container and chassis combination. In addition, the upper connecting plates include means for mounting a container without a highway chassis. The upper connecting plates may also contain means for coupling to a fifth wheel of a trailer extending on opposed outer edges of the plates. Thus, the apparatus of the present invention permits the connection to either end of a standard container and highway trailer without requiring any modification to the container or chassis.

The elongated push-pull bars include means for attaching the bars to the upper connecting plates at several positions for adjusting the distance between the bogies. This permits the apparatus to accommodate various length containers and trailers utilized, thereby further increasing the versatility of the apparatus.

The rail bogies of the present invention are adapted for constructing an articulated train connecting a plurality of highway trailers for transport over rail. The upper connecting plates are swivelably attached to an intermediate lifting platform to permit the trailers to easily negotiate curves. The lifting means for raising and lowering the lifting platform are mounted to a lower platform which is attached to the lower rail bogie frame. Shock absorbers are provided between the lower rail frame and the lower platform tp absprb the vertical forces placed on the bogie by the containers. The push-pull bars link the bogies to each other and take up all the horizontal forces exerted on the container train. Thus, none of the forces are exerted on the containers to prevent the container from becoming damaged during transport.

In building the train, a single bogie can attach to the front corner castings of one trailer and to the rear corner castings of a second trailer. A multiple trailer articulated train can, therefore, be easily constructed having three bogies for every two trailers. The push-pull bars extending between the bogies are made of a lightweight composite material to facilitate the formation of the train. The apparatus of the present invention can also be used for the double stack transport of containers. A double acting twistlock frame is placed between the containers that secures the top container to the bottom container. In geographic areas where there is a minimum clearance of 19 feet, the bogie can be altered to include smaller diameter rail wheels.

The apparatus of the present invention permits an articulated container train to be formed that is lightweight to reduce fuel costs while traveling over rail. In addition, the total number of locomotives required to pull the container train may be reduced. Hence, the use of a fuel inefficient flatcar is eliminated as well as the need for piggyback loading equipment at the rail yard. Furthermore, modifications to the containers, required by the prior art, that reduce the fuel and cargo carrying efficiency of the containers while traveling over the road are eliminated.

BRIEF DESCRIPTION OF THE DRAWINGS

FIG. 1 is a perspective view of the apparatus of the present invention.

FIG. 2 is a perspective view of the apparatus of the present invention having a highway trailer mounted thereon.

DETAILED DESCRIPTION OF THE INVENTION

Figure 3:
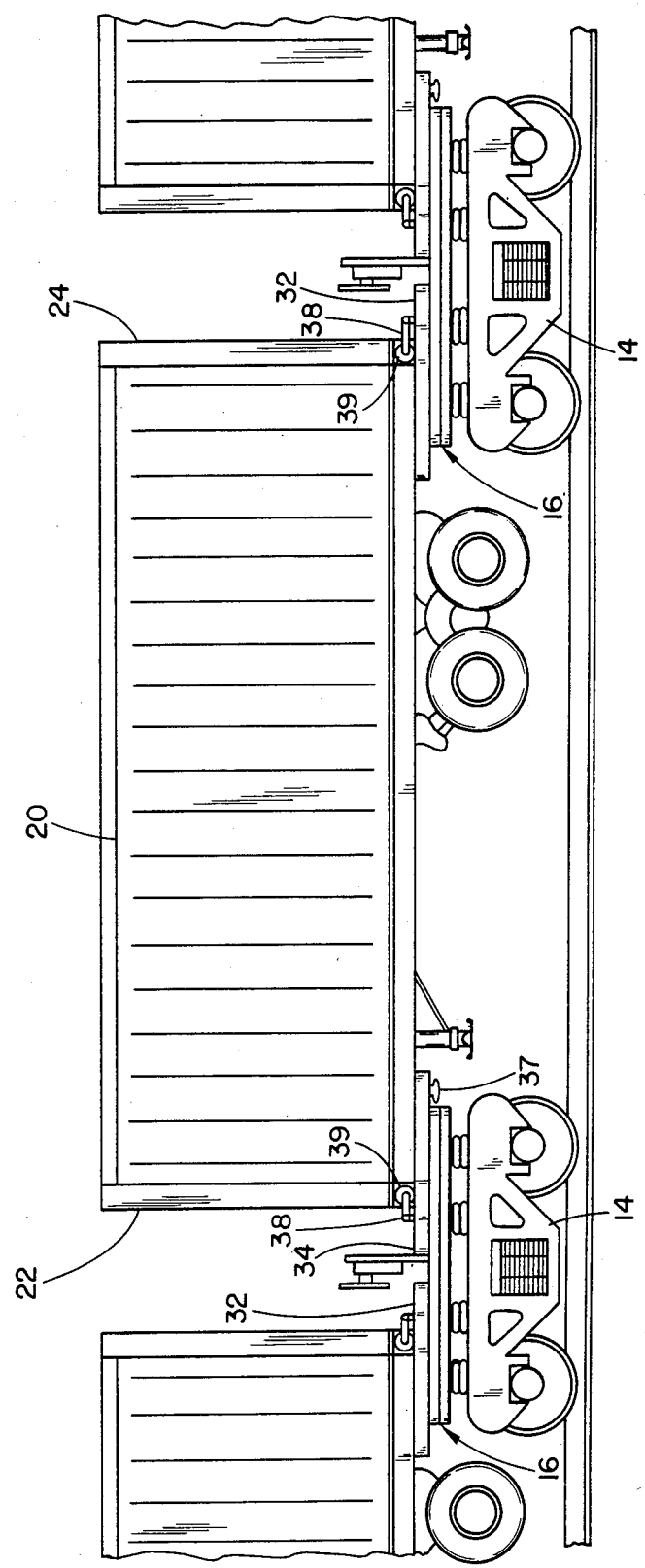
FIG. 3 is a side view of two bogies showing the attachment to a highway trailer.

Referring now to the drawings, the apparatus of the present invention is generally shown as numeral 10 in FIG. 1 and includes two identical double axle rail bogies 12 each having a lower bogie frame 14 and an upper platform section 16. The upper platform section 16 may include a lifting means, not shown, to raise and lower a portion of the platform section for raising and lowering the wheels of a trailer off the ground. The apparatus 10 includes a pair of spaced elongated push-pull bars 18 that are releasably attached to the upper platform section 16 and extend longitudinally between the rail bogies 12.

As shown in FIGS. 2 and 3, a container 20 extends between the bogies 12 with each end 22 and 24 of the container being releasably attached to an upper platform section 16 of a bogie 12. FIGS. 2 and 3 show the container 20 as a container chassis combination or trailer, however, the apparatus may also accommodate a container only without a chassis. The bars 18 extend along the longitudinal sides 26 and 28 of the container 20 and include mounting means 30 on the distal ends of the bars 18 for releasably connecting to the upper platform 16. The bars 18 absorb the horizontal dynamic push-pull forces exerted on bogies 12 as the apparatus 10 is transported on the rails thereby preventing the forces from being exerted on the container.

To facilitate the connection of the trailer 20 to the bogie 12, the upper platform section 16 is lowered by the lifting means to a low position that permits the ends 22 and 24 of the highway trailer to be attached to the rail bogies 12 while the trailer wheels 33 are on the ground. The lifting means then raises the upper section 16 to raise the trailer and the trailer wheels 33 off the ground to permit transport by rail.

The apparatus of the present invention can be utilized to form a train of containers by adding additional bogies 12 and bars 18 to build the train. To facilitate the formation of the train, the upper platform section 16 includes two upper connecting plates 32 and 34, each having a pair of clamping means 38 for connecting to the corner castings of the trailer 20. The upper connecting plates 32 and 34 also include means 31 for securing a container without a highway chassis. The clamping means 38 is rotatable to lock into the corner castings of the container only. FIG. 3 shows the connection of the bogies 12 to the trailer 20 before the bars 18 are attached. The clamping means 38 locks in openings 39 in the corner castings of the trailer 20. In addition, a coupling means may be provided for attaching to the fifth wheel 37 of the trailer 20. Each bogie 12, therefore, can have mounted thereon either end of a trailer or container only to permit one bogie 12 to be utilized to mount one end of two containers. Thus, three bogies 12 are required for every two containers. In this manner, an articulated train having a plurality of containers can be formed without having any modifications made to the standard intermodal trailer or container only. Furthermore, the upper plates 32 and 34 are swivelably attached to the upper platform 16 to allow the train to negotiate the curves in the rail lines.

The versatility of the present apparatus for forming a highway train is increased by providing that the bars 18 be adjustably mounted to the bogies 12 to change the length that the bars 18 extend between the bogies 12. In one embodiment, the mounting means 30 permits the bars 18 to be releasably attached to the upper plates 32 and 34 at three different positions thereby allowing the apparatus to support various length trailers, such as, 35, 40 and 45 foot trailer bodies. An illustrative embodiment of the mounting means 30 will be described hereinafter.

Figure 4:
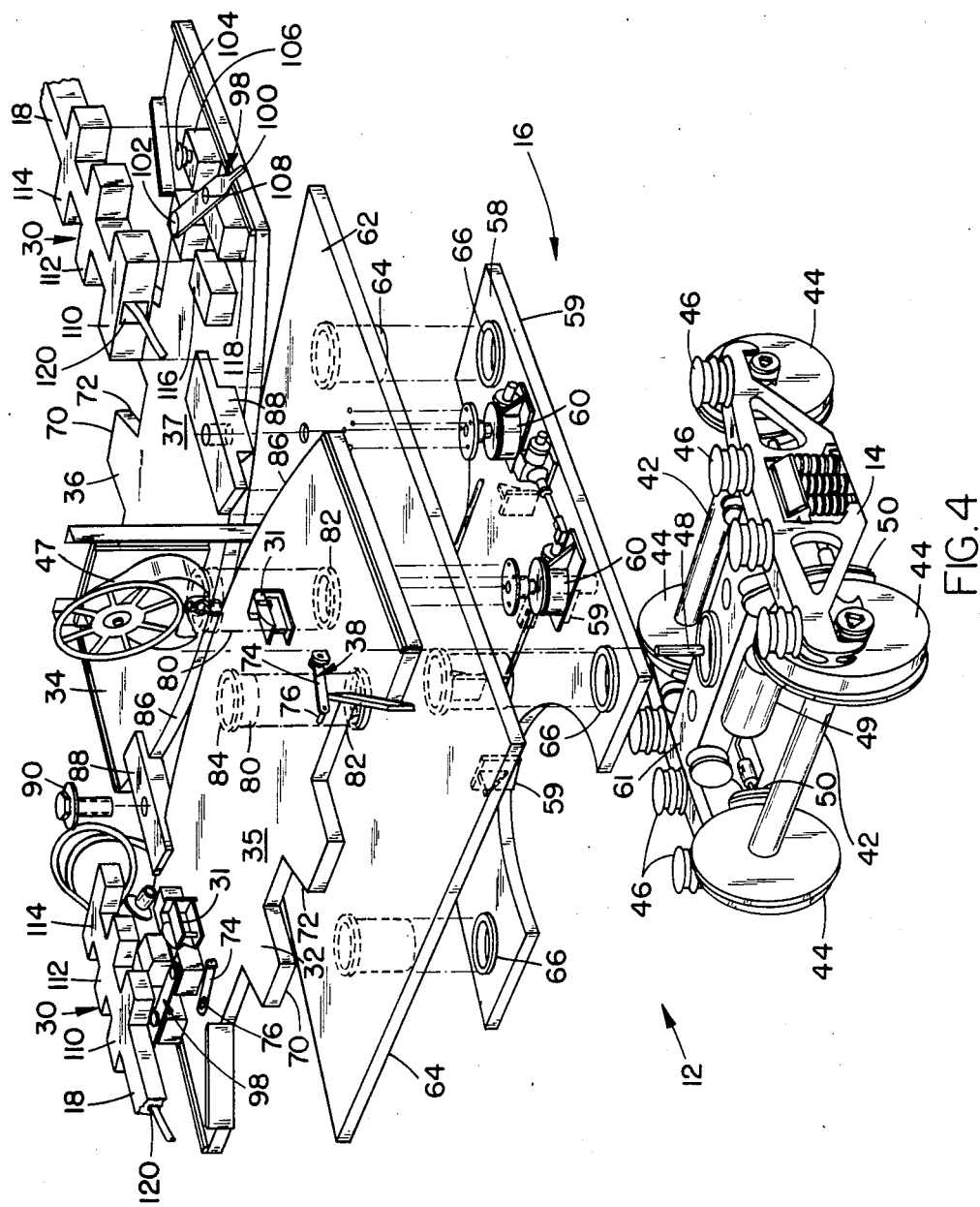
FIG. 4 is an exploded view of the rail bogie of the present invention.

FIG. 4 shows a detailed exploded view of a bogie 12. The bogie frame 14 has two axles 42 on which are rotatably mounted rail wheels 44. Shock absorbers 46 are provided on the frame 14 to absorb vertical forces exerted by the highway trailers. Preferably, the shock absorbers 46 are made of an elastomeric material especially designed to absorb large forces. The bogie rail frame 14 also includes a standard rail hand brake 47 mounted to the lower platform 58 and an air tank 49 for operating brakes 50.

The upper platform section 16 includes a lower platform 58 mounted to the frame 14 and resting upon shock absorbers 46. The lower platform 58 includes at least one pair of pads 59 secured to the bottom surface of the platform 58 that rest against opposite sides of the bolster 61. The pads 59 position the lower platform 58 to prevent longitudinal movement of the lower platform 58 with respect to the frame 14. In addition, a bushing that encloses the center pin 48 may be provided that concentrically meshes with a bushing, not shown, mounted to the bottom surface of the lower platform 58 to further position the platform 58 onto the frame 14. A plurality of lifting means 60 are mounted to the lower platform 58 for raising and lowering the highway trailers 20. In the illustrative embodiment shown in FIG. 3, the lifting means are mechanical worm gear screw jacks that may be obtained from the Joyce-Cridland Company of Dayton, Oh.

An intermediate lifting platform 62 is mounted to the jacks 60 by suitable nuts and bolts not shown. Cylindrical bushings 64 are secured to the lower surface of the lifting platform 62 for example, by welding. The bushings 64 slide within apertures 66 in the lower platform 58, to absorb any longitudinal forces exerted between the intermediate lifing platform 62 and the lower platform 58.

The upper connecting plates 32 and 34 include section 36 for supporting and lifting a chassis of a trailer. The section 36 may include a cutout 72 on opposed outer edges 70 to accomodate a container lock located on the rear of the chassis. The cutout 72 may also be designed for coupling to the fifth wheel of a highway trailer. In addition, the plates 32 and 34 include clamping means 38 mounted to the upper surfaces 35 and 37 of the plates 32 and 34 for clamping to the corner castings on the front and rear ends of a trailer. In the illustrative embodiment shown in FIG. 4, the clamping means includes a spring loaded latch 74 for engaging rods 76 within an aperture in the corner castings of the highway trailer. Each of the upper plates 32 and 34 include a pair of latches 74 to clamp onto both sides of the trailer. By providing the clamping means 38 on both upper plates 32 and 34, either end of a highway trailer may be mounted to the plates 32 and 34 without modification to the trailers. Furthermore, a pair of mounting means 31 are provided on each plate 32 and 34 for receiving and locking a cargo container without a highway chassis. The latch 74 can be rotated to clamp into the corner castings of the container held in the mounting means 31. To simplify the drawings, only the plate 32 is shown with the mounting means 31 and the clamping means 38 but it is understood that the plate 34 also includes the identical mounting and clamping means.

A bushing 80 is provided between each plate 32 and 34 and the intermediate lifting platform 62. The bushings 80 are secured to the plates 32 and 34 and slide within apertures 82 in the intermediate plate 62 to absorb any longitudinal forces exerted between the plates 32, 34 and the intermediate lifting platform 62.

The plates 32 and 34 are swiveably mounted to the intermediate plate 62 by the bushings 80 which rotate within the apertures 82. The bushing 80 provides spacing between the plates 32, 34 and the intermediate platform 62. The bushings 80 have a lip 84 that permits the plates 32 and 34 to rotate relative to the intermediate platform 62. A nylon bearing may be provided within the aperture 64 to facilitate rotation. The plates 32 and 34 are also provided with arcuate inner edges 86 that facilitate the pivoting of the plates 32 and 34 about the bushings 80 as the bogie 12 negotiates a curve in the rail tracks. Dogs 88 are provided between the edges 86 of the plates 32 and 34 and are bolted to the intermediate plate 62 by bolts 90 to keep the plates 32 and 34 level.

The bars 18 are releasably attached to the upper plates 32 and 34 by locking means 98. In the illustrative embodiment shown in FIG. 4, locking means 98 includes a swivel bar 100 mounted to an inner block 102 and a nob 104 mounted to an outer block 106. The bars 18 are placed between the blocks 102 and 106 and the swivel bar 100 is rotated over the bars 18 with a notch 108 in the bar 100 locking onto the knob 104. The mounting means 30 rests between the block 102 and 106 and spaced block 116 and 118 to prevent longitudinal movement of the bars 18. For drawing simplification, the locking means 98 and mounting means 30 for attaching the bars 18 is only shown on one side of the plates 32 and 34 but it is to be understood that the mounting means is located on both sides of the plates 32 and 34 to accommodate the mounting of two bars 18 on each of the plates.

The mounting means 30 for adjusting the length that the bars 18 extend between the bogies 12 is shown in the illustrative embodiment of FIG. 4 as including three T sections 110, 112 and 114 on the distal ends of the bars 18. The three T sections 110, 112 and 114 permit the bars 18 to be placed within the locking means 98 at three different positions which result in three different lengths between the bogies 12. When the section 110 is placed between the blocks 102, 104 and 116, 118, the distance between the bogies 12 will accommodate a 35 ft. trailer. Similarly, when the section 112 is placed within the locking means 98 a 40 ft. trailer is accommodated and when the section 114 is placed within the locking means 98 a 45 ft. trailer is accommodated. In addition, the bars 18 have channels 120 running through the entire length of the bars to facilitate the placement of air hoses for the pneumatic operation of the brakes 50 of the bogies 12.

The bars 18 are made of a high strength fiber composite material for absorbing the high horizontal forces exerted on the bogies. The composite material used for constructing the bars 18 must be lightweight to permit easy installation by hand. For example, the bars 18 can be made of fiberglass with carbon or Kevlar fibers.

In operation, a rail bogie 12 is placed on the tracks at a location that is accessible to over the road highway trailers by being level with the ground. The highway trailer 20 is then backed onto either plate 32 or 34 of the bogie 12 by a tractor or yard hostler. The rear end of the trailer 20 is connected to the upper plate 32 or 34 with the locking means 38 by placing the bars 76 into the apertures 39 in the corner castings in the rear of the trailer 20 as shown in FIG. 3. The front end 22 of the trailer 20 is then lined up with the tracks and the landing gear of the chassis are lowered, so that the tractor can release the trailer and pull away. The second bogie 12 is also on the tracks and is pushed under the front end 22 of the trailer 20 and is secured by the clamping means 38. The lightweight bars 18 are then placed on the connecting plates 32 and 34 along the longitudinal sides of the trailer 20 and are locked into place with the locking means 98. All air lines are connected and the landing gear are raised up.

The lifting means 60 is then actuated and the intermediate platform and the upper plates are lifted up to a raised position wherein the wheels of the highway trailer are off the ground to permit rail travel. In the lowest position, the lifting means 60 permits the connection of the trailer 20 to the connecting plates 32 and 34 while the trailer is on the ground. The above operation is repeated to build an articulated train of several highway trailers for transporting cargo over rail.

When the train reaches the desired destination, the trailer is lowered and the elongated bars are removed. All locks are disengaged and the landing gear are then lowered. The bogie attached to the front is then pulled away from the trailer and a tractor can then attach to the trailer to hall the trailer to the final destination on the highway.

The apparatus of the present invention provides a lightweight transport system for supporting containers by rail. The reduction in weight by the elimination of the rail flatcar provides a substantial fuel savings. Furthermore, standard intermodal containers can be used without any modification to maximize the net cargo capacity of the containers traveling by road. Moreover, the elongated bars absorb the horizontal dynamic push-pull forces as the train is traveling over the rails to prevent container damage during transportation.

While illustrative embodiments of the subject invention have been described and illustrated, it is obvious that various changes and modifications can be made therein without departing from the spirit of the present invention which should be limited only by the scope of the appended claims.

What is claimed is:

1. An apparatus for the rail transportation of an intermodal container with or without a highway chassis, said intermodal container having opposed ends and opposed longitudinal sides and corner castings at each corner of the container for securing the container to another structure, said apparatus comprising:

two double axle rail bogies, each of said bogies comprising an upper connecting plate pivotally mounted relative to said bogie, with the upper connecting plate of a first of said bogies being releasably attached to one end of said intermodal container by the two corner castings at said one end thereof, and the upper connecting plate of a second of said bogies being releasably attached to the other end of said intermodal container by the two corner castings at said other end thereof, with said first and second bogies directly supporting substantially all of the weight of said intermodal container which is transferred directly from each end of the intermodal container to the bogie positioned therebeneath, each of said rail bogies includes a lifting means for raising and lowering said container, and a pair of elongated push-pull bars releasably attached to said rail bogies and extending between said rail bogies adjacent the longitudinal sides of said container, with the pair of elongated push-pull bars absorbing the dynamic push-pull forces exerted on the bogies as the apparatus is transported on rails and not supporting any substantial portion of the weight of said intermodal container which is transferred directly from each end of the intermodal container to the bogie positioned therebeneath.

2. The apparatus of claim 1, wherein the elongated bars include means for adjusting the length the bars extend between the rail bogies.

3. The apparatus of claim 1, wherein each of said rail bogies includes a lower double axle bogie frame and an upper platform section upon which the upper connecting plate is pivotally mounted.

4. The apparatus of claim 3 wherein each of said upper connecting plates include means for clamping to bottom corner castings of said container.

5. The apparatus of claim 4, wherein each of said upper connecting plates includes means for mounting a container witout a highway chassis.

6. The apparatus of claim 5, wherein each of said upper connecting plates includes means for coupling to a fifth wheel of a highway chassis.

7. The apparatus of claim 6, wherein said upper platform section includes a lower platform mounted to said lower bogie frame, said lifting means being mounted to said lower platform.

8. The apparatus of claim 7, wherein the upper platform section includes an intermediate lifting platform secured to said lifting means.

9. The apparatus of claim 8, wherein said lifting means includes a plurality of screw jacks mounted to said lower platform.

10. The apparatus of claim 8, wherein said rail bogies include shock absorbing means mounted between said lower bogie frame and said bottom platform.

11. The apparatus of claim 1, wherein said elongated bars are made of a lightweight composite material.

12. The apparatus of claim 11, wherein said elongated bars are made of fiberglass having fibers of carbon or Kevlar.

13. The apparatus of claim 1, wherein said elongated bars are hollow for receiving a hose means for operating a breaking means for said lower bogie frame.

14. An apparatus for the rail transportation of a highway trailer having opposed longitudinal sides and bottom corner castings having an opening, said apparatus comprising:

two spaced double axle rail bogies having a lower bogie frame and an upper platform section, said upper platform section of said rail bogie including a pair of upper connecting plates swivelably mounted to a lifting platform, each of said upper connecting plates having means for releasably clamping into the openings in the bottom corner castings of a highway trailer;

each of said double axle rail bogies including lifting means for raising and lowering said lifting platform and said upper connecting plates for raising and lowering said highway trailer; and a pair of spaced elongated push-pull bars extending between said rail bogies, each of said bars being releasably attached to one of the upper connecting plates on each rail bogie for extending adjacent the longitudinal sides of said highway trailer extending between said rail bogies.

15. The apparatus of claim 14, wherein said elongated bars include means for adjustably attaching said bars to the upper connecting plates for varying the length said bars extend between said rail bogies.

16. The apparatus of claim 14, wherein said lifting means includes a plurality of screw jacks mounted to a lower platform secured to said lower bogie frame.

17. The apparatus of claim 14, wherein each of said upper connecting plates includes means for attaching to a container without a highway chassis.

18. The apparatus of claim 14, wherein said elongated bars are made of a lightweight composite material.

19. An apparatus for the rail transportation of a highway trailer having opposed ends, opposed longitudinal sides, a fifth wheel mechanism and road wheels adapted for highway travel, said apparatus comprising:

first and second rail bogies, a first of said bogies being releasably attached to one end of said highway trailer and a second of said bogies being releasably attached to the other end of said highway trailer, each of said bogies having a double axle bogie frame with railroad wheels rotatably mounted on the ends of said axles, a lower platform carried by said bogie frame, an intermediate lifting platform mounted above said lower platform, means for raising and lowering said lifting platform, a pair of upper connecting plates swivelably mounted to said lifting platform, said upper connecting plates including means for coupling said rail bogie to the fifth wheel of said highway trailer on opposed edges of said connecting plates, and means for securing said rail bogie to the body of said highway trailer on the upper surface of said connecting plates; and a pair of elongated push-pull bars extending between said rail bogies adjacent the longitudinal sides of said highway trailer, said elongated bars being releasably attached to one of the upper connecting plates on each rail bogie, said elongated bars having means for adjusting the length extending between said rail bogies;

whereby said lifting means together with said lifting platform being operative to raising and lowering said upper connecting plates from a lowered position to a raised position, said upper connecting plates being disposed low enough in the lowered position to permit the fifth wheel mechanism of said highway trailer to be coupled to said upper plates while the road wheels of said highway trailer are on the ground and said upper connecting plates being raised high enough in said raised position to lift the wheels of said highway trailer off the ground.

20. The apparatus of claim 19, wherein said upper plates include means for releasably securing a container without a highway chassis.

21. The apparatus of claim 19, wherein said elongated bars are made of a lightweight composite material.

22. A system for the rail transporation of at least two intermodal containers with or without a highway chassis, said intermodal containers having opposed ends and opposed longitudinal sides and corner castings at each corner of the container for securing the container to another structure, said system comprising:

at least three double axle rail bogies, each of said bogies comprising an upper connecting plate pivotally mounted relative to said bogie, with the upper connecting plate of a first of said bogies being releasably attached to one end of a first intermodal container by the two corner castings at said one end thereof, and the upper connecting plate of a second of said bogies being releasably attached to the other end of said first container and one end of a second container by the two corner castings at each end thereof, a third of said bogies being relasably attached to the other end of said second container by the two corner castings at said other end thereof, with said bogies directly supporting substantially all of the weight of each intermodal container which is transferred directly from each end of intermodal container to the bogie positioned therebeneath, each of said bogies includes lifting means for raising and lowering said containers; and a pair of elongated push-pull bars for each container being releasably attached to said rail bogies between said bogies, said elongated bars being adjacent the longitudinal side of said containers, with each pair of elongated push-pull bars absorbing the dynamic push-pull forces exerted on the bogies as the system is transported on rails and not supporting any substantial portion of the weight of the intermodal container which is transferred directly from each end of the intermodal container to the bogie positioned therebeneath.

23. The system of claim 22, wherein said elongated bars include means for adjustably attaching said bars to the rail bogies for varying the length between said rail bogies.

24. The system of claim 22, wherein said elongated bars are made of a lightweight composite material.

25. A system for the rail transportation of a plurality of highway trailers comprising:

at least two highway trailers having a fifth wheel mechanism on the front end, openings in the corner castings in the rear end and opposed longitudinal sides:

at least three spaced rail bogies having a lower double axle bogie frame and an upper platform section, said upper platform section of each rail bogie including a pair of connecting plates swivelably mounted to a lifting platform, each of said upper connecting plates having means for releasably clamping into the openings in the corner castings a highway trailer;

a first of said rail bogies being releasably clamped to the corner castings on the front end of a first highway trailer, a second rail bogie being releasably clamped to the corner castings on the rear end of said first highway trailer and said second rail bogie being releasably clamped to the corner castings on the front end of a second highway trailer, and a third rail bogie being releasably clamped to the corner castings on the rear end of said second highway trailer;

each of said rail bogies including lifting means for raising and lowering said lifting platform and said upper connecting plates for raising and lowering said plurality of highway trailers; and a pair of spaced elongated push-pull bars for each highway trailer extending between said rail bogies, each of said bars being releasably attached to the upper connecting plates connected to the respective trailer, each of said pair of elongated bars extending adjacent the longitudinal sides of the respective highway trailer.

26. The system of claim 25, wherein said upper connecting plates of each rail bogie include means for securing a container without a highway chassis.

27. The system of claim 25, wherein said elongated bars are made of a lightweight composite material.

28. The system of claim 25, wherein said upper connecting plates include means for releasably coupling said upper connecting plates to the fifth wheel of the highway trailer.

* * * * *